Patented Apr. 18, 1950

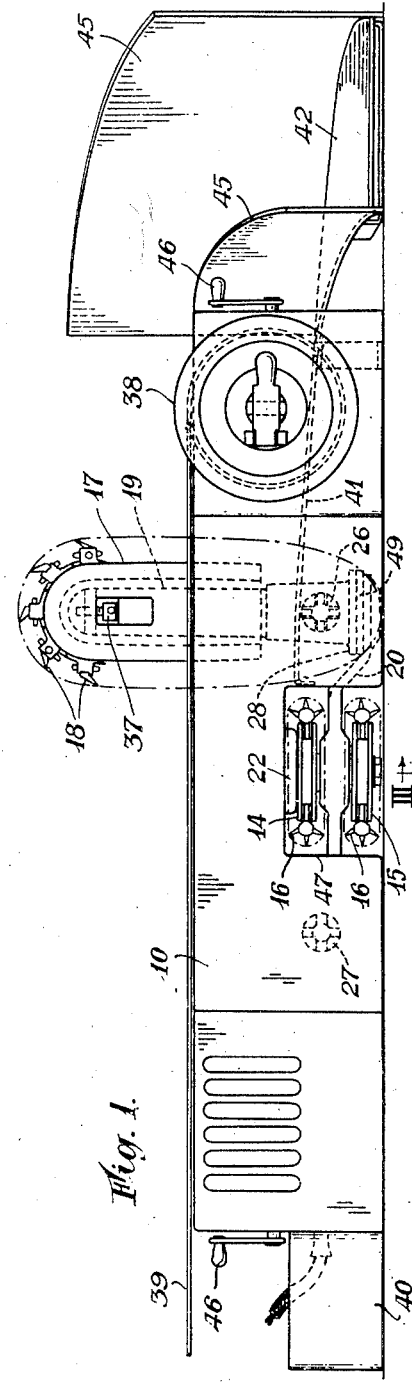

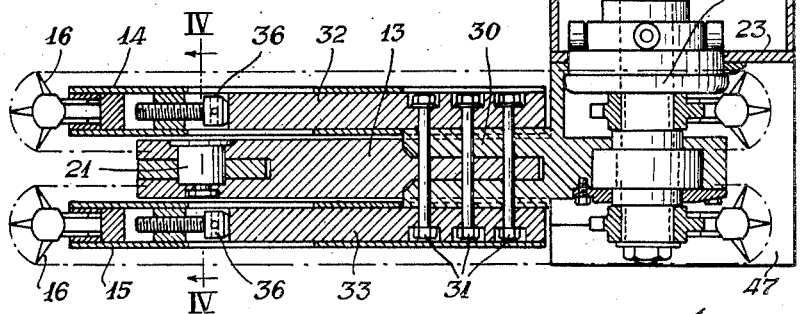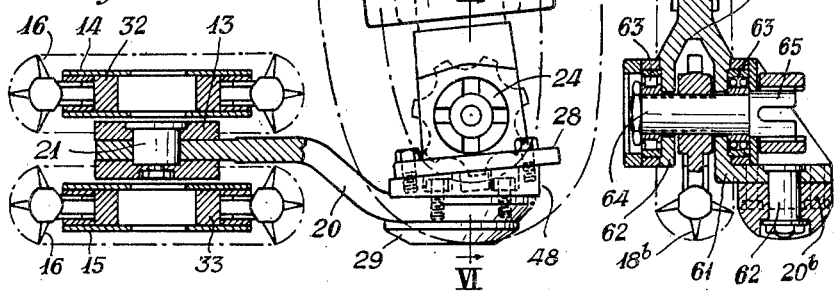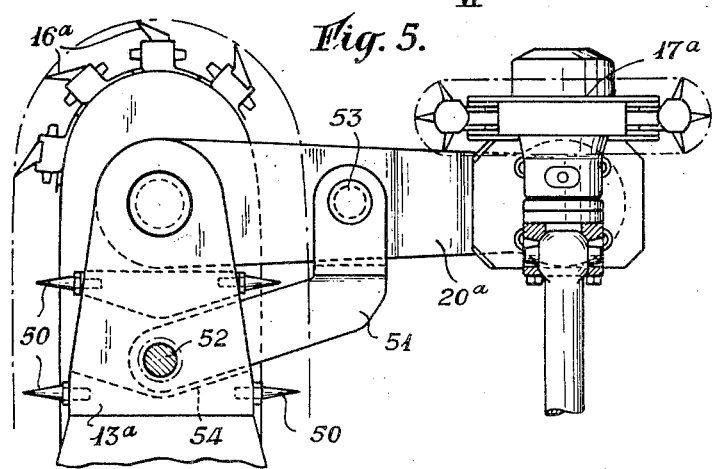

2,504,598

UNITED STATES PATENT OFFICE 2,504,598

COAL CUTTING MACHINE

William Vincent Sheppard, Rainworth, near Mansfield, England

Application March 23, 1948, Serial No. 16,537
In Great Britain April 1, 1947

12 Claims. (Cl. 262—30)

This invention relates to coal cutting machines of the kind which are adapted to be traversed over the floor of a mine to and fro alongside the coal face thereof, the machine being provided with horizontal cutting jibs having chain type cutters for extending into and operating horizontally in the coal face for effecting undercutting thereof, and with a vertical shearing jib also having chain type cutters for extending into and operating vertically in the coal face for effecting a vertical cut therein remote from the face thereof and in a plane substantially parallel with the line of traverse of the machine, the undercutting and vertical cutting of the coal face being effected in each direction of traverse of the machine.

An object of the invention is to provide an improved coal cutting machine having horizontal cutting jibs that will be capable of operating in the coal face in either direction of traverse of the machine without dismantling or disconnecting them from the machine.

It is also an object of the invention to provide that the vertical shearing jib may be connected to the horizontal cutting jibs so as to be capable of operating therewith in either direction of traverse of the machine without the necessity for disconnecting it from said horizontal cutting jibs.

It is a further object of the invention so to connect the vertical shearing jib to the horizontal cutting jibs that it will be slung therefrom by cantilever with which it may be swung to either side of the horizontal cutting jibs for trailing thereby according to the direction of traverse of the machine.

It is a further object of the invention to provide means on the machine for directing the gotten coal to the front of the machine and on to a conveyor between which and the coal face the machine is traversed.

These and other objects of the invention will be apparent from the following description together with the reference therein to the accompanying diagrammatic drawings in which:

Fig. 1 is an elevation of one form of coal cutting machine made in accordance with this invention.

Fig. 2 is a plan of same showing the machine set in the operative position at a coal face and ready for traversing to the left.

Fig. 3 is a section on the line III—III of Fig. 2 drawn to an enlarged scale.

Fig. 4 is a section on the line IV—IV of Fig. 3.

Fig. 5 is a detail view showing a modification.

Fig. 6 is a detail view representative of a section on the line VI—VI of Fig. 4 but showing a slight modification thereof.

Figure 7:
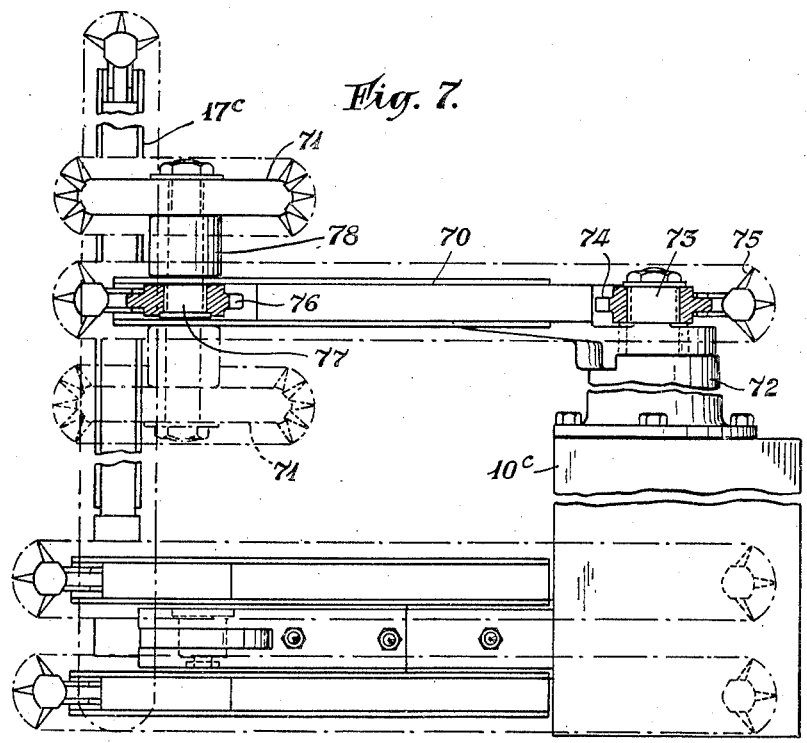
Fig. 7 is an end elevation, partly in section, of a modified form of machine.

Referring to Figs. 1, 2, 3 and 4, Sheets 1 and 2, the body of the machine with motor and gearing therein is represented generally at 10 and located alongside the coal face 11 of a mine for haulage along the floor to and fro substantially in parallel with said coal face between it and a conveyor 12.

Projecting at right angles from the body 10, medially of the ends thereof, is a common supporting structure 13 for a pair of upper and lower horizontal cutting jibs 14 and 15 each fitted with cutters 16 of the chain type for operating in the coal face 11 to effect under-cutting thereof as the machine is hauled along the floor.

Slung from the outer end of the supporting structure 13 is a vertical shearing jib 17 fitted with cutters 18 also of the chain type, said shearing jib being supported by a jib post 19 which is carried by a downwardly cranked cantilever arm 20 pivoted to the supporting structure 13 as shown at 21 in Fig. 4, and projecting therefrom in the space between the upper and lower cutting jibs 14 and 15. The vertical shearing jib 17 is thereby capable of being manipulably swung, about the pivot 21, to a position at either side of the horizontal cutting jibs 14, 15 when clear of the coal face, and, during traverse of the machine, said shearing jib is located at the rear of said horizontal cutting jibs for trailing therebehind.

The chain cutters 16 of the horizontal cutting jibs 14, 15 are operated by a driving head 22 as seen in Fig. 3, extending through a cross member 23 in the machine body 10. The chain cutters 18 of the vertical shearing jib 17 are operated by a driving head 24, Figs. 2 and 4, carried by the lower end of the jib post 19, and this driving head is adapted to be coupled by a transmission shaft 25 selectively at either side of the horizontal cutting jibs 14, 15, to one or other of two driving points 26, 27 of the gear drive (not shown) provided in the machine body 10 for the purpose.

It will be seen therefore, that when the machine is being traversed to the left, looking at Fig. 2, the vertical shearing jib driving head 24 is coupled by the shaft 25 to the driving point 26 as shown in dotted lines but when the machine is being traversed to the right, said driving head 24 is coupled by the shaft 25 to the driving point 27 as shown in dash and dot lines.

The vertical shearing jib post 19 is provided with an integral bracket 28, Fig. 4, by which it is secured to the cantilever arm 20 and the cantilever arm has a depending base 29 for riding on the floor so as to give additional support to the vertical jib post 19.

The supporting structure 13 for the horizontal cutting jibs 14, 15 is rooted to the machine body 10 by means of a bifurcated root part 30 to which the forward part of said structure is detachably bolted by the bolts 31, shown more clearly in Fig. 3.

The upper and lower horizontal jib posts 32 and 33 respectively are also secured by the bolts 31 to the root part 30 and the upper and lower jibs 14, 15 are carried by their respective jib posts 32, 33 so as to be capable of longitudinal adjustment in well known manner as, for example, by an adjusting device 36, Figs. 2 and 3, to suit the overall length of their chain cutters.

Similarly, the vertical shearing jib 17 is also capable of longitudinal adjustment by the adjusting device 37, Fig. 1.

The machine is fitted with a haulage winch 38, Figs. 1 and 2, the rope 39 of which is hitched at its free end to any suitable anchorage, said winch being driven, as is usual, from the motor driven gearing (not shown) in the body 10 whereby the machine is traversed as the rope is wound upon the winch.

A plough device 40 is removably and interchangeably attachable to either end of the machine body according to which end thereof is the front at the time of traverse of the machine.

A trailing chute 41, Figs. 1 and 2, comprising two lengths of which the outer length 42 is curved and reversibly attachable to the other, is provided for receiving gotten coal and discharging it on to the conveyor 12. The delivery end of this chute rides on the floor while at its feed end it is supported at one side by being secured at 43 to a stationary part of the driving head 24 of the vertical shearing jib 17 and at the opposite side to a detachable eye lug 44, Fig. 2, which is attached to the machine body 10 at the trailing side of the horizontal cutting jibs 14, 15, for securing the chute according to which end of the machine the chute is being trailed. The curved length 42 is provided with vertical side walls 45 to guide the coal to the delivery end of the chute.

Dual controls 46 are provided, one set at each end of the machine body for operating the motor driven gearing.

As will be seen in Fig. 1, the body 10 of the machine is provided with an opening 47 extending from the front to the back thereof to provide a passage for the chain cutters 16 of the horizontal cutting jibs 14, 15 and the root part 30 of the supporting structure 13 is extended laterally in being rooted to the machine body as seen in Fig. 1.

The supporting structure 13 for the horizontal cutting jibs 14, 15 is rooted to the machine body so that the return bends of the horizontal chain cutters 16 at the inner ends of said jibs operate about a centre located substantially medially of the ends of the machine body 10 and in a vertical plane near to the longitudinal axis thereof, thus providing that the horizontal cutting jibs 14, 15 will operate in either direction of traverse of the machine and also providing that the chain cutters 16 will bring broken coal as small "cuttings" through the opening 47 in the machine body and deposit them on to the conveyor 12.

The shearing jib 17 is mounted on the cantilever arm 20 so as to be capable of being swivelled thereon.

In operation and assuming the coal face has first been opened out at the right hand end as shown in Fig. 2, to enable the machine to be set in position as shown and for traversing towards the left, the horizontal cutting jibs 14, 15 will, on movement of the machine, undercut the coal face while the vertical shearing jib, trailing in the wake of said cutting jibs, will effect a vertical cut at the back of the coal face, with the result that coal, above the upper horizontal cutting jib 14 and between it and the vertical shearing jib, will break away and fall on to the chute 41, 42 and be pushed or slide down to the delivery end thereof and be discharged on to the conveyor 12. Some of the coal removed by the two horizontal cutting jibs 14, 15 will be conveyed by the cutters thereof through the opening 47 in the machine body to the front thereof and be deposited to the conveyor 12.

While the machine is operating and before it reaches the end of its traverse, however, the left hand end of the coal face is opened out sufficiently to allow the vertical shearing jib 17 to be swivelled through 180° upon the cantilever arm 20 and to be swung therewith about the pivot 21, Figs. 3 and 4, and round the outer end of the horizontal cutting jibs 14, 15 and the transmission drive shaft 25 transferred and coupled to the vertical shearing jib and to the point 27, Fig. 2, on the machine. The chute 41, 42 is secured in position at the opposite end of the machine with the length 42 thereof reversed. The machine is then moved sideways up to the newly formed coal face and set ready for operational traverse in the opposite direction, that is to say, to the right looking at Fig. 2, and as the machine again operates, the horizontal cutting jibs 14, 15 and vertical shearing jib 17 operate in the coal face as before described but in the opposite direction.

Should it be desired to tilt the vertical shearing jib to either side of verticality, a wedge shaped packing piece 48, Fig. 4 is substituted for a parallel packing piece 49, Fig. 1, which is normally used.

Where desired the chute 41, 42 may be subjected to a jolting action in order to assist movement of the coal thereon towards the delivery end thereof.

Referring now to the modified construction shown in the detail view Fig. 5, Sheet 2, the horizontal jib supporting structure 13a from which the upper jib is omitted, is provided with a plurality of fixed coal picks 50 located at intervals in the sides of the structure 13a for the purpose of facilitating the breaking down of coal in the space between the operative area of the upper and lower cutters 16a of the horizontal jibs when the machine is being traversed.

Fig. 5 also shows an arrangement for rigidly holding the cantilever arm 20a against undesired pivotal movement so that the vertical shearing jib 17a shall not swing during traverse of the machine. This arrangement comprises a cranked anchoring arm 51 which is anchored to the horizontal jib supporting structure 13a by a removable pin 52 and to the cantilever arm 20a similarly by a pin 53, said jib structure being slotted at 54 to accommodate the anchoring arm and the latter being bifurcated to straddle the cantilever arm in being secured thereto.

Referring to Fig. 6, Sheet 2, the vertical shearing jib post 19b has a bifurcated basal part 60, one limb 61 of which is extended laterally at right angles for securing to the cantilever arm 20b by the swivel pin 62 while each limb 61, 62 is fitted with bearings 63 for the cutter chain driving spindle 64 which is adapted at its end 65 for coupling up to the machine for operating the chain cutters 18b.

Figure 8:
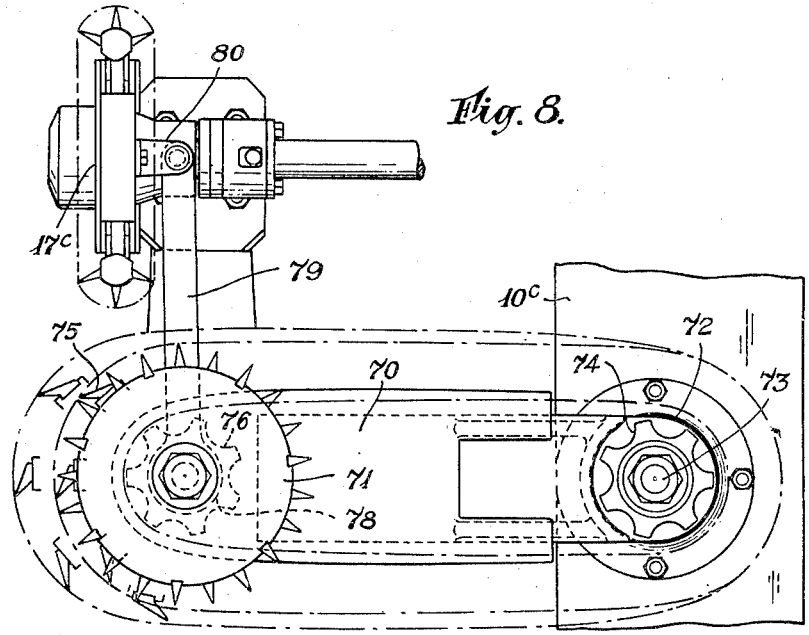
Fig. 8 is a plan of the machine shown in Fig. 7.

Figs. 7 and 8, Sheet 3, show a further modified form of machine which is suitable for operating in seams of coal which are thicker than those usually met with. In this modified construction, an additional horizontal cutting jib 70 is fitted to the machine along with a rotary cutting element 71 which may be fitted above the additional jib 70 as shown in full lines, or preferably, below it as shown in chain lines. The additional jib 70 and rotary cutting element 71 are supported from the top of the machine body 10c by a turret 72 secured thereto and accommodating a vertical driving spindle 73 which is operated from the driving gear (not shown) within the machine body 10c for operating the sprocket wheel 74 which drives the chain cutters 75 of said jib. At its outer end, the additional horizontal cutting jib 70 is provided with a driven sprocket 76 made fast to a spindle 77 which is extended to carry and drive the rotary cutting element 71. This spindle 77 extends rotatably through one end 78 of an anchoring arm 79 which is connected to a lug 80 at the upper end of the vertical shearing jib 17c, as seen in Fig. 8, thus affording additional support thereto and restraining said jib against undesired pivotal or swinging movement.

A rotary cutting element 71 such as is shown in Figs. 7 and 8, may be mounted on the top of the upper horizontal cutting jib 14 shown in Figs. 1 to 4 inclusive.

What I claim is:

1. A coal cutting machine comprising, a machine body, upper and lower horizontal cutting jibs carrying separate endless chain cutters operably in parallel horizontal planes, a common supporting structure carrying said jibs and located therebetween and rooted to the machine body intermediate the ends thereof, a driving head on said supporting structure for operating the horizontal jib chain cutters, a cantilever arm pivoted to the supporting structure remote from the machine body and extending between said horizontal jib for manipulable swinging movement therebetween, a vertical shearing jib carrying an endless chain cutter operably in a vertical plane connected to the free end of said cantilever arm in trailing relation to said supporting structure and clear of the horizontal chain cutters for swingable movement with said cantilever arm around the outer ends of the horizontal jibs, a chain cutter driving head on the vertical jib, driving mechanism in the machine body for operating the chain cutter driving heads of the horizontal and vertical jibs, and means on the machine body at both sides of the horizontal jibs selectively couplable by transmission shaft to the chain cutter driving head of the vertical jib.

2. A coal cutting machine as claimed in claim 1, characterized by the vertical shearing jib being connected to the cantilever arm about a swivel pin thereon.

3. A coal cutting machine comprising, a machine body, upper and lower horizontal cutting jibs carrying separate endless chain cutters operably in parallel horizontal planes, a common supporting structure carrying said jibs and located therebetween and rooted to the machine body intermediate the ends thereof, a cantilever arm pivoted to the supporting structure remote from the machine body and extending between said horizontal jibs for manipulable swinging movement therebetween, a vertical shearing jib carrying an endless chain cutter operably in a vertical plane and connected to the free end of said cantilever arm in trailing relation to said supporting structure for swingable movement with said cantilever arm around the outer ends of the horizontal jibs, means connected to and anchoring the cantilever arm to the supporting structure, and driving mechanism in the machine body for operating the chain cutters of the horizontal cutting and vertical shearing jibs.

4. A coal cutting machine comprising, a machine body, upper and lower horizontal cutting jibs carrying separate endless chain cutters operably in parallel horizontal planes, a common supporting structure carrying said jibs and located therebetween and rooted to the machine body intermediate the ends thereof, a cantilever arm pivoted to the supporting structure remote from the machine body and extending between said horizontal jibs for manipulable swinging movement therebetween, a vertical shearing jib carrying a vertically operable endless chain cutter and slung from said supporting structure swivelably upon the cantilever arm for manipulable swinging movement therewith about the outer end of said supporting structure, driving mechanism in the machine body for operating the chain cutters of the horizontal cutting and vertical shearing jibs, and means on the machine body at both sides of the horizontal jibs selectively couplable by transmission shaft to the vertical shearing jib for operating the chain cutter thereof.

5. A coal cutting machine comprising, a machine body, upper and lower horizontal cutting jibs carrying separate endless chain cutters operably in parallel horizontal planes, a common supporting structure carrying said jibs and located therebetween and rooted to the machine body intermediate the ends thereof, a cantilever arm pivoted to the supporting structure remote from the machine body and extending between said horizontal jibs for manipulable swinging movement therebetween, a vertical shearing jib carrying a vertically operable endless chain cutter and slung from said supporting structure swivelably upon the cantilever arm for manipulable swinging movement therewith about the outer end of said supporting structure, means detachably anchoring the cantilever arm to the supporting structure, driving mechanism in the machine body for operating the chain cutters of the horizontal cutting and vertical shearing jibs, and means on the machine body at both sides of the horizontal jibs selectively couplable by transmission shaft to the vertical shearing jib for operating the chain cutter thereof.

6. A coal cutting machine comprising, a machine body, upper and lower horizontal cutting jibs carrying separate endless chain cutters operably in parallel horizontal planes, a common supporting structure carrying said jibs and located therebetween and rooted to the machine body intermediate the ends thereof, and about an opening extending transversely therethrough which admits passage of the horizontal chain cutters, a cantilever arm pivoted to the supporting structure remote from the machine body and extending between said horizontal jibs for manipulable swinging movement therebetween, a vertical shearing jib carrying a vertically operable endless chain cutter and slung from said supporting structure for trailing at either side thereof upon the cantilever arm, said vertical shearing jib being swingable with said arm around and clear of the horizontal chain cutters and about a pivotal connection of said arm with said supporting structure, driving mechanism in the machine body for operating the horizontal and vertical chain cutters, means on the machine body at opposite sides of the horizontal jibs selectively couplable by transmission shaft to the vertical shearing jib for operating the chain cutter thereof, and a chute movable with the machine for trailing at either side of the horizontal jibs and adapted to direct coal gotten from the coal face by the jibs to the front of the machine.

7. A coal cutting machine comprising, a machine body, upper and lower horizontal cutting jibs carrying separate endless chain cutters operably in parallel horizontal planes, a common supporting structure carrying said jibs and located therebetween and rooted to the machine body intermediate the ends thereof, and about an opening extending transversely therethrough which admits passage of the horizontal chain cutters, a cantilever arm pivoted to the supporting structure remote from the machine body and extending between said horizontal jibs for manipulable swinging movement therebetween, a vertical shearing jib carrying a vertically operable endless chain cutter and slung from said supporting structure for trailing at either side thereof upon the cantilever arm, said vertical shearing jib being swingable with said arm around and clear of the horizontal chain cutters and about a pivotal connection of said arm with said supporting structure, means detachably anchoring the cantilever arm to the supporting structure, driving mechanism in the machine body for operating the horizontal and vertical chain cutters, means on the machine body at opposite sides of the horizontal jibs selectively couplable by transmission shaft to the vertical shearing jib for operating the chain cutter thereof, and a chute movable with the machine for trailing at either side of the horizontal jibs and adapted to direct coal gotten from the coal face by the jibs to the front of the machine.

8. A coal cutting machine comprising, a machine body, upper and lower horizontal cutting jibs carrying separate endless chain cutters operably in parallel horizontal planes, a common supporting structure carrying said jibs and located therebetween and rooted to the machine body intermediate the ends thereof, and about an opening extending transversely therethrough which admits passage of the horizontal chain cutters, a cantilever arm pivoted to the supporting structure remote from the machine body and extending between said horizontal jibs for manipulable swinging movement therebetween, a vertical shearing jib carrying a vertically operable endless chain cutter and slung from said supporting structure for trailing at either side thereof upon the cantilever arm, said vertical shearing jib being swingable with said arm around and clear of the horizontal chain cutters and about a pivotal connection of said arm with said supporting structure, the outer end of said cantilever arm engaging the floor for riding thereon, driving mechanism in the machine body for operating the horizontal and vertical chain cutters, means on the machine body at opposite sides of the horizontal jibs selectively couplable by transmission shaft to the vertical shearing jib for operating the chain cutter thereof, and a chute movable with the machine for trailing at either side of the horizontal jibs and adapted to direct coal gotten from the coal face by the jibs to the front of the machine.

9. A coal cutting machine comprising, a machine body, upper and lower horizontal cutting jibs carrying separate endless chain cutters operably in parallel horizontal planes, a common supporting structure carrying said jibs and located therebetween and rooted to the machine body intermediate the ends thereof, and about an opening extending transversely therethrough which admits passage of the horizontal chain cutters, a cantilever arm pivoted to the supporting structure remote from the machine body and extending between said horizontal jibs for manipulable swinging movement therebetween, a vertical shearing jib carrying a vertically operable endless chain cutter and slung from said supporting structure for trailing at either side thereof upon the cantilever arm, said vertical shearing jib being swingable with said arm around and clear of the horizontal chain cutters and about a pivotal connection of said arm with said supporting structure, the outer end of said cantilever arm engaging the floor for riding thereon, means detachably anchoring the cantilever arm to the supporting structure, driving mechanism in the machine body for operating the horizontal and vertical chain cutters, means on the machine body at opposite sides of the horizontal jibs selectively couplable by transmission shaft to the vertical shearing jib for operating the chain cutter thereof, and a chute movable with the machine for trailing at either side of the horizontal jibs and adapted to direct coal gotten from the coal face by the jibs to the front of the machine.

10. A coal cutting machine as claimed in claim 9, characterized by the provision of fixed cutter picks upon the common supporting structure at the sides thereof and between the lines of cut of the horizontal cutting jibs.

11. A coal cutting machine as claimed in claim 10, characterized by the vertical shearing jib being supported for adjustment within its own plane to either side of verticality.

12. A coal cutting machine as claimed in claim 9 characterized by an additional horizontal cutting jib supported by and above the machine body and carrying a rotary cutting element operable by said jib, and means on said jib connected to and supporting the vertical shearing jib at its upper end.

WILLIAM VINCENT SHEPPARD.

REFERENCES CITED

The following references are of record in the file of this patent:

UNITED STATES PATENTS

| Number | Name | Date |
| --- | --- | --- |
| 1,424,114 | Morgan | July 25, 1922 |
| 1,778,298 | Levin | Oct. 14, 1930 |
| 1,979,694 | Logan | Nov. 6, 1934 |
| 2,100,178 | White | Nov. 23, 1937 |
| 2,143,789 | Moore | Jan. 10, 1939 |
| 2,283,696 | Pray | May 19, 1942 |

FOREIGN PATENTS

| Number | Country | Date |
| --- | --- | --- |
| 18,516 | Great Britain | Aug. 10, 1897 |